United States Patent [19]
VanZandt et al.

[11] Patent Number: 6,075,754
[45] Date of Patent: *Jun. 13, 2000

[54] SINGLE-COIL FORCE BALANCE VELOCITY GEOPHONE

[76] Inventors: Thomas R. VanZandt, 206 Ave. C, Redondo Beach, Calif. 90277; Stephen J. Manion, 2231 Midlothian Dr., Altadena, Calif. 91001

[*] Notice: This patent issued on a continued prosecution application filed under 37 CFR 1.53(d), and is subject to the twenty year patent term provisions of 35 U.S.C. 154(a)(2).

[21] Appl. No.: 09/058,114

[22] Filed: Apr. 8, 1998

Related U.S. Application Data

[60] Provisional application No. 60/042,977, Apr. 8, 1997.

[51] Int. Cl.$^7$ .................................................... H04R 11/00
[52] U.S. Cl. ............................................................ 367/182
[58] Field of Search .................................... 367/182, 185, 367/135; 181/121; 73/514.01

[56] References Cited

U.S. PATENT DOCUMENTS

| | | | |
|---|---|---|---|
| 3,508,444 | 4/1970 | Sitomer et al. | 73/517 |
| 3,877,314 | 4/1975 | Bernin | 73/517 B |
| 4,051,718 | 10/1977 | Meckl et al. | 73/71.2 |
| 4,253,164 | 2/1981 | Hall, Jr. | 367/22 |
| 4,412,317 | 10/1983 | Asjes et al. | 367/185 |
| 4,538,203 | 8/1985 | Flanner et al. | 361/159 |
| 4,891,983 | 1/1990 | Stewart | 73/517 B |
| 5,119,345 | 6/1992 | Woo et al. | 367/185 |
| 5,172,345 | 12/1992 | van der Poel | 367/178 |
| 5,789,677 | 8/1998 | McEachern | 73/514.19 |

OTHER PUBLICATIONS

Klaassen et al., Electronic Acceleration–Sensitive Geophone* For Seismic Prospecting**, Geophysical Prospecting, vol. 31, 1983, pp. 457–480.

Usher et al. "Wide–Band Feedback Seismometers*", Physics of the Earth and Planetary Interiors, vol. 18, (1979), pp. 38–50.

Obuchi et al., "A moving Coil Dynamic accelerometer", 53rd EAED Meeting, May 1991, pp. 1–4.

*Primary Examiner*—Daniel T. Pihulic
*Attorney, Agent, or Firm*—Christie, Parker & Hale, LLP

[57] ABSTRACT

The invention converts a conventional velocity geophone to a force-balance accelerometer. A single, spring supported geophone coil, in conjunction with a permanent magnet assembly fixed to the geophone housing, is used as both an electromagnetic velocity sensor and a force actuator. An electronic circuit is used to implement a force-balance feedback control system. The electromotive force associated with the velocity of the coil is detected and used as an input to the feedback control system. The output of the control system is applied to the same coil in such a manner as to provide negative feedback. In the presence of accelerations, the coil velocity with respect to the geophone housing is reduced essentially to zero. Thus, the force related to the external acceleration acting on the coil-mass, is balanced by the applied force. Specifically, the current applied by the control system to the same coil is proportional to the acceleration of the housing.

21 Claims, 6 Drawing Sheets

SINGLE-COIL FORCE BALANCE VELOCITY GEOPHONE

CROSS REFERENCE TO RELATED APPLICATION

This application claims the benefit of the filing date of U.S. Provisional Application No. 60/042,977 filed on Apr. 8, 1997, the disclosure of which is incorporated by reference.

BACKGROUND OF THE INVENTION

The invention relates generally to apparatus for measuring mechanical accelerations, and more specifically to a single coil force-balance velocity geophone.

A conventional geophone has a single coil-mass, and a magnet, both of which are contained in a housing. Generally, springs connected to the housing support the coil, thus allowing motion in one dimension relative to the housing, and the magnet is fixed with respect to the housing. The relative motion of the coil, in the magnetic field of the magnet, induces an electromotive force ("emf"), or voltage, in the coil. Accordingly, geophones may also be constructed in which the magnet is attached movably in the housing while the position of the coil is fixed with respect to the housing.

The coil is often a solenoid of finite length, in which a copper wire is wound circumferentially around a hollow, cylindrical, bobbin-form. By "single-coil," it is meant that a single, continuous length of wire has been wound into a coil, and that connection to the coil is available only at the two ends of the wire. Specifically, in a single-coil design, there is no access to electrical signals at any intermediate point within the coil. This is in contrast to dual-coil and multiple-coil transducers, in which there are separate connection points (terminals) at both ends of each coil in the transducer.

In many conventional single-coil velocity geophones, the coil may actually be split into two electrically-connected, but physically-displaced, coils, which have been wound in opposite directions. However, in these geophones, the displaced coils are still formed from one length of wire, and more importantly, connection to displaced coils is made only at the ends of the wire. That is, even in these "split-coil" geophones, one has access to electrical signals only at the outer ends of the coils. There is no capability for accessing points between the split-coils. In short, the conventional single-coil velocity geophone is inherently a two-terminal device, regardless of whether it utilizes split-coils.

FIG. 1 of U.S. Pat. No. 5,119,345 the disclosure of which is incorporated by reference, provides a cutaway drawing of a typical, conventional, single-coil, velocity geophone. The voltage across these two terminals provide the output signal from the device. This voltage is proportional to the velocity of the housing, for frequencies above the natural resonant frequency of the spring-coil-mass system. The voltage falls off as the square of frequency, for frequencies below this resonant frequency. Important performance characteristics for geophones are their bandwidth, linearity, and dynamic range.

The bandwidth of the geophone, as a velocity sensor, is normally expressed as the frequency range over which the output response (typically in volts per unit case velocity) of the sensor is nearly constant. In this instance, the term "constant" typically implies that the response does not vary by more than a factor of two. In a conventional geophone, this frequency range normally extends from just above the resonant frequency to a frequency that is typically twenty times the resonant frequency. As an acceleration sensor, however, the conventional geophone, has a peaked response at its natural frequency, and a much smaller bandwidth. This is shown in FIG. 1. In FIG. 1, the signal output from a conventional geophone is shown on the y-axis 100, as frequency is varied along the x-axis 105, in response to both a constant velocity 115 and a constant acceleration 120. The vertical line 110 depicts the natural resonant frequency of the conventional geophone. In most applications, a conventional geophone is used to record ground velocity signals at frequencies above its natural resonant frequency, because the response does not vary over frequency.

The linearity is often expressed in terms of total harmonic distortion (THD). THD is defined as the ratio of the root sum of squares of output voltages arising at integer multiples of a particular driving frequency to the voltage at that driving frequency, when the geophone is driven with a monotonic velocity. Higher linearity devices exhibit lower THD values. Linearity is limited typically by the magnetic non-linearities associated with the motion of the coil in a non-uniform magnetic field gradient, and by the mechanical non-linearities associated with large deflections of the spring which supports the coil.

The dynamic range is normally expressed as the ratio of maximum measurable signal to the minimum resolvable signal, in a given bandwidth of frequency (e.g., 1 Hz). The minimum resolvable signal is limited typically by electronic noise in the recording system (due partially to the source impedance represented by the coil). The maximum measurable signal is limited by the maximum allowable displacement of the coil-mass ($d_{max}$, typically 1 mm, peak-to-peak). This displacement limit leads directly to a full-scale velocity (equal to $2\pi f d_{max}$, at frequency f) or full-scale acceleration (equal to $(2\pi f)^2 d_{max}$, at frequency f) input range for the conventional geophone. The full-scale velocity or acceleration range of any one conventional geophone is fixed by the mechanical design of its components, and cannot be changed in a simple manner.

Conventional single-coil velocity geophone technology is highly evolved. The sensors are compact, rugged, and inexpensive. They are manufactured in large volume, with a low unit cost, by three major manufacturers: Geo Space Corporation (Houston, Tex.) Mark Products (Houston, Tex.) and Sensor NL (Netherlands). A wide range of resonant frequencies are available (1 Hz to ~400 Hz).

Examples of conventional geophones are the Mark Products Ultraphone, UM-2, Sensor NL SM-4-LD, and the Geo Space GS-30CT. Conventional geophones have typical large signal THD values of $\leq 0.1\%$. Conventional geophones can exhibit dynamic ranges in excess of $10^6$ (100 Hz bandwidth). Higher bandwidth, linearity, and dynamic range are normally attained in conventional geophones through more careful design, assembly, and test. In general, conventional geophones with higher performance specifications, have a higher unit cost.

Many applications require direct sensing of acceleration, rather than velocity. Specifically, seismic techniques for imaging the subsurface structure of the earth, can generate improved data if the sensors measure acceleration directly. This is because of the fact that typically, the "signal" of interest (longitudinal or shear bulk waves), is at higher frequency than certain unwanted "background" signals (e.g., surface propagating Rayleigh waves). As the acceleration amplitude is equal to the velocity amplitude times $2\pi f$, a measurement of acceleration amplitude will provide a higher ratio of "signal" to "background" than will a measurement of velocity. Unfortunately, conventional geophones have reduced bandwidth when measuring accelerations, compared to their performance for velocity measurement.

In addition, new, state-of-the-art applications in seismic imaging are requiring further improvements in linearity, over the levels provided by conventional geophones. Finally, many applications require accelerometers with user-selectable measurement ranges. All of these applications are highly constrained in terms of cost.

SUMMARY OF THE INVENTION

The present invention provides a single coil force balance geophone. The geophone has a housing, a coil, and a magnet for producing a magnetic field. The coil and the magnet are coupled to the housing by springs or other means so that relative motion of the coil within the magnetic field produced by the magnet occurs when the housing is subject to accelerations. In one embodiment a reference impedance is connected in series with the coil. A series impedance, which may be two resistors connected in series, is connected in parallel with the reference impedance and the coil. Together, the series impedance, the reference impedance, and the coil form a load supplied a current by a voltage-to-current current source. The series impedance portion of the circuit has an impedance connection point between the series impedance elements, and an electrical signal, such as a potential or voltage, is derived from the impedance connection point. Additionally, the reference impedance may be connected to the coil by a connector, the connector substantially maintained at a reference potential, such as a virtual ground, by a feedback element.

In another embodiment, the relative motion of the coil and the magnetic field generates an induced potential across terminals of the coil. An output signal is generated proportional to the induced potential, with a current source providing a controlled current based on the output signal. The output signal may be formed from a preliminary signal taken from the impedance connection, which is then amplified by an amplifier to form an intermediate signal before being passed through a low pass filter to form a device signal.

In one embodiment, the controlled current source is an adjustable current source, such that the magnitude of the controlled current is adjustable by changing a resistance value associated with the controlled current source such as an adjustable resistor connected to an input of an amplifier, the adjustable resistor thereby forming a current source control element. Similarly, in one embodiment, amplification of the preliminary signal by the amplifier is adjustable by changing a resistance value associated with the amplifier.

It is an object of the invention to provide a technique for implementing force-balance feedback on a conventional, single-coil, velocity geophone in such a way to allow the transducer to be acceleration-sensitive.

Another object is to allow the accelerometer to have constant acceleration response over as wide a frequency range as possible, and for providing a capability for controlling and adjusting this bandwidth, without modifying the mechanical structure or mechanical properties of the conventional, single-coil, velocity geophone.

Another object is to increase the linearity of the accelerometer, over that of the conventional, single-coil, velocity geophone from which it is made.

Another object is to increase the dynamic range of the accelerometer, over that of the conventional, single-coil, velocity geophone.

Another object is to provide a method whereby the full-scale range of the accelerometer can be adjusted simply, using electronic means, so as not to require any modification of the mechanical structure or properties of the geophone.

Another object is to provide a method which can be applied to conventional, low-cost, single-coil geophones, to provide the above performance improvements, using low cost, non-critical components, which add relatively little size and mass to the finished sensor.

Another object is to provide a transducer that meets the requirements for seismic imaging applications. These include constant acceleration sensitivity over a wide bandwidth, high linearity, low cost, high dynamic range, and the ability to form arrays of individual sensors connected in series. This last requirement refers to the practice of spatial filtering to cancel unwanted surface wave signals encountered in seismic imaging. Conventional velocity geophones are normally connected in series combinations to provide this filtering.

Another object, therefore, is to provide a method whereby the improved transducers can still be connected in series combinations for the purpose of eliminating surface wave signals.

The above objects can be attained through the use of an electronic circuit that applies force-balance feedback to a single-coil velocity geophone. The invention provides a way for using the single coil of the geophone as both a velocity sensor and a force feedback actuator. Specifically, the invention provides a technique for detecting a voltage on the geophone coil, related to the residual velocity of the coil, with respect to the geophone housing, and for simultaneously forcing a feedback current through the same coil. The invention controls the polarity of this feedback current in such a manner as to provide negative feedback, thus reducing the velocity of the coil to near zero, even when external accelerations are being applied to the geophone housing. Under this condition, the feedback current is proportional to the external acceleration driving the housing of the geophone. The invention provides a signal that is proportional to this current, and thus proportional to the applied acceleration. The application of force-balance feedback allows the accelerometer to have a higher full-scale acceleration level, thus increasing the dynamic range over that of the conventional geophone, from which it is made. The acceleration range of the accelerometer can be changed through the simple adjustment of a resistor relating the output signal to the feedback current. Similarly, the frequency range or bandwidth of the accelerometer is easily controlled by a simple adjustment of the gain of an amplifier in the control electronics. The linearity is improved over that of a conventional geophone, since the coil is being held essentially fixed, thus removing the major sources of non-linearity in conventional geophones (magnetic and mechanical non-linearities related to displacement of the coil-mass). Finally, the feedback electronics are configured with a floating signal ground in a way that allows this ground potential to be set anywhere in a range between the voltages of the power sources which supply power to the electronics. This provides the capability for a series connection of force-balance accelerometers, in which the signal output of one accelerometer drives the signal ground of the succeeding accelerometer in the chain.

Many of the attendant features of the present invention will be more readily appreciated as the same becomes better understood by reference to the following detailed description and considered in connection with the accompanying drawings in which like reference symbols designate like parts throughout.

DETAILED DESCRIPTION

Figure 2:
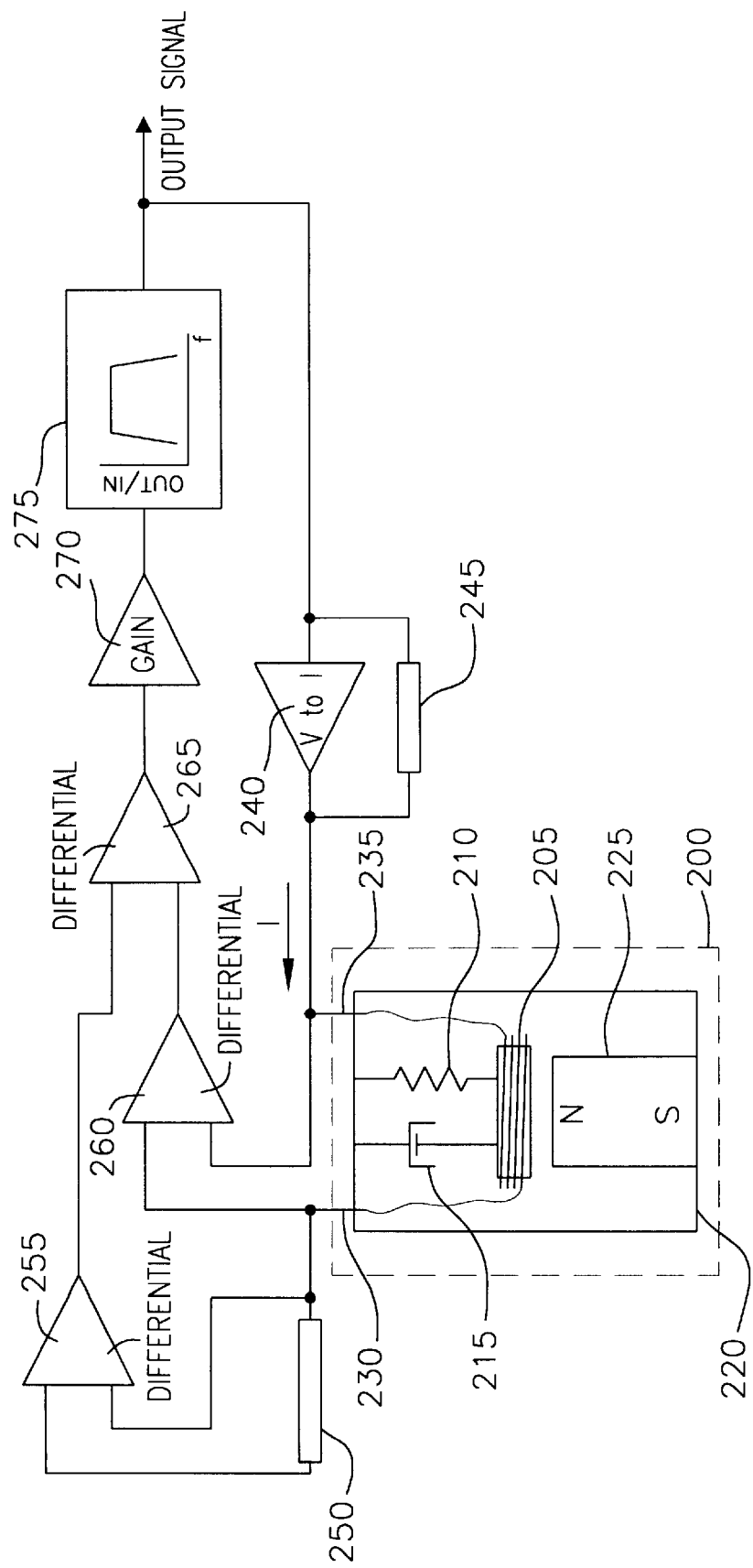
FIG. 2 illustrates a partial schematic partial block diagram illustrating a concept of a single coil force-balance feedback geophone of the present invention.

FIG. 2 illustrates a concept of the invention. A conventional single-coil velocity geophone 200 contains a spring mass-damper system. This system consists of a coil-mass 205 attached by a spring 210 to a geophone housing 220. Electro-mechanical damping, inherent in the geophone, is depicted conceptually by a dashpot 215. The coil-mass is in the vicinity of one pole of a magnet 225, and thereby acts as a coil-magnet velocity sensor. The magnet is attached to the housing 220. The coil-mass in the vicinity of a pole of the magnet also acts as a coil-magnet actuator. The actuator applies force to the same coil-mass of the spring-mass-damper system. Passing current through the coil generates an induced magnetic field. Interaction between the induced magnetic field and the magnetic field of the magnet results in application of an electromagnetic force to the coil.

The electrical connections to the single-coil-mass are made at terminals 230 and 235. A transconductance amplifier having high input and output impedances consists of an amplifier 240. The amplifier 240 operates as a voltage-to-current converter, with the ratio of voltage-to-current being set by an impedance 245. The amplifier 240 supplies a feedback current to the coil.

A feedback current compensator consists of a reference impedance 250, and three differential stages 255, 260, and 265. A first stage 255 measures the signal across impedance 250. A second stage 260 measures the signal across the geophone terminals 230, 235. A third stage 265 measures the difference between the outputs of the preceding two stages, thereby providing a measurement of the difference between the signals across the geophone terminals and the reference impedance. With the proper choice of reference impedance 250, the output of stage 265 is a signal proportional to the relative velocity between the geophone coil and the geophone housing. This is normally attained when the reference impedance value nearly matches the electrical impedance of the coil.

A feedback controller consists of a proportional gain stage 270 and a filter network 275. The output of the filter is fed back to the input of the transconductance amplifier. The output of the filter is also the output signal from the device.

Figure 3:
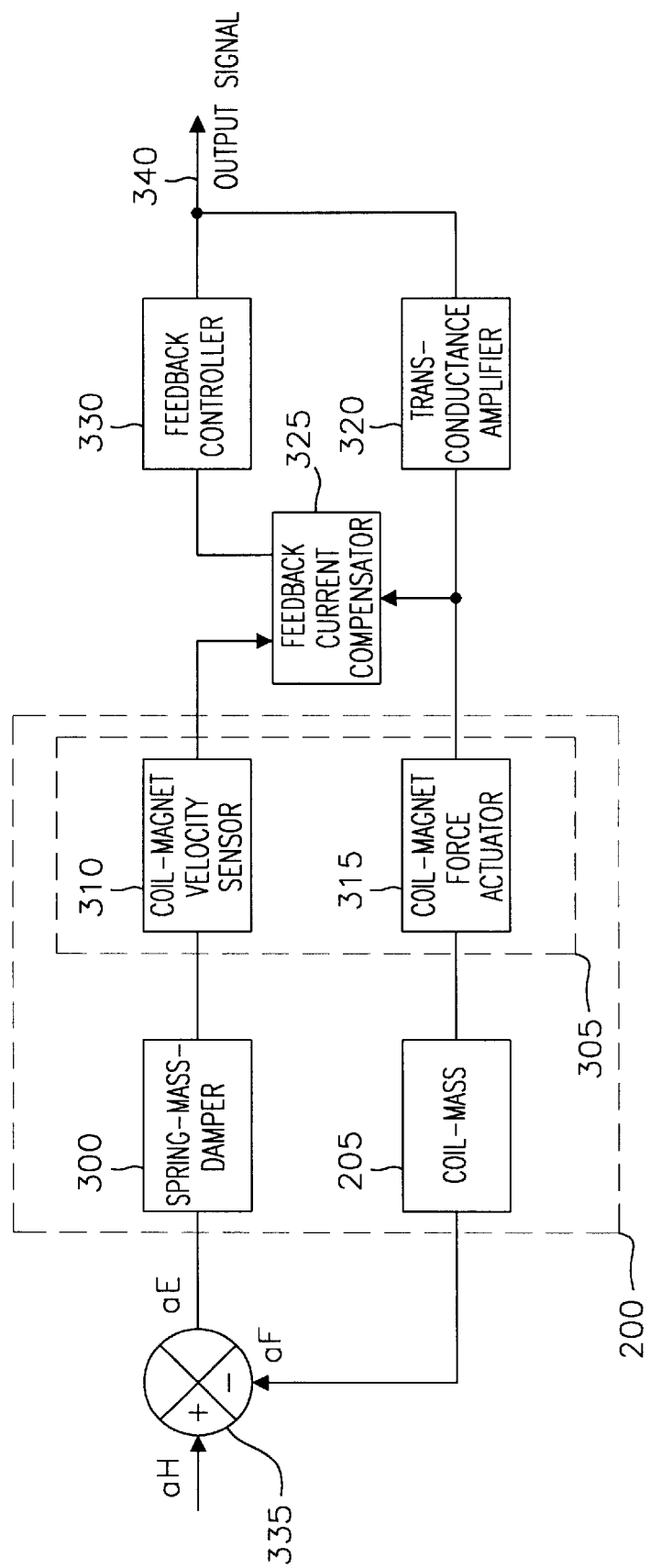
FIG. 3 illustrates a block diagram of the concept of the single coil force-balance feedback geophone of FIG. 2.

FIG. 3 provides a further functional description of the system through the use of a block diagram. The system includes a single-coil velocity geophone 200. The conventional single-coil velocity geophone includes a spring-mass-damper system 300 which converts mechanical accelerations into relative velocities between the coil-mass and the conventional geophone housing. The single-coil velocity geophone also includes an inertial coil-mass 205 to which feedback forces are applied and a single coil and magnet system 305. The feedback acceleration is equal to the applied feedback force times the reciprocal of the coil mass.

The single-coil and magnet system provides two simultaneous functions. One function is that of a coil-magnet velocity sensor 310 for converting the relative velocity between the coil-mass and housing to an electromotive force (i.e., voltage). Another function is that of a coil-magnet force actuator 315 for converting an electrical signal into a force on the coil-mass. Under feedback control, this force is essentially equal to the external acceleration time the mass of the coil-mass. The system also includes a transconductance amplifier 320, a feedback current compensator 325, and a feedback controller 330.

The transconductance amplifier 320 provides voltage controlled current to the coil-magnet-based actuator with a current to voltage ratio set by a single resistance. The feedback current compensator 325 provides removal of voltage equal to the feedback current times the geophone electrical impedance from the total voltage appearing across the geophone terminals. The feedback controller 330 provides proportional gain and filtering to provide both high feedback loop gain, as well as feedback loop stability.

In keeping with the standard practices related to force-balance accelerometers, FIG. 3 depicts a "summing junction" 335, at which feedback acceleration ($a_F$) is combined with the external acceleration of the sensor housing ($a_H$), resulting in an "error acceleration" ($a_E$).

Figure 4:
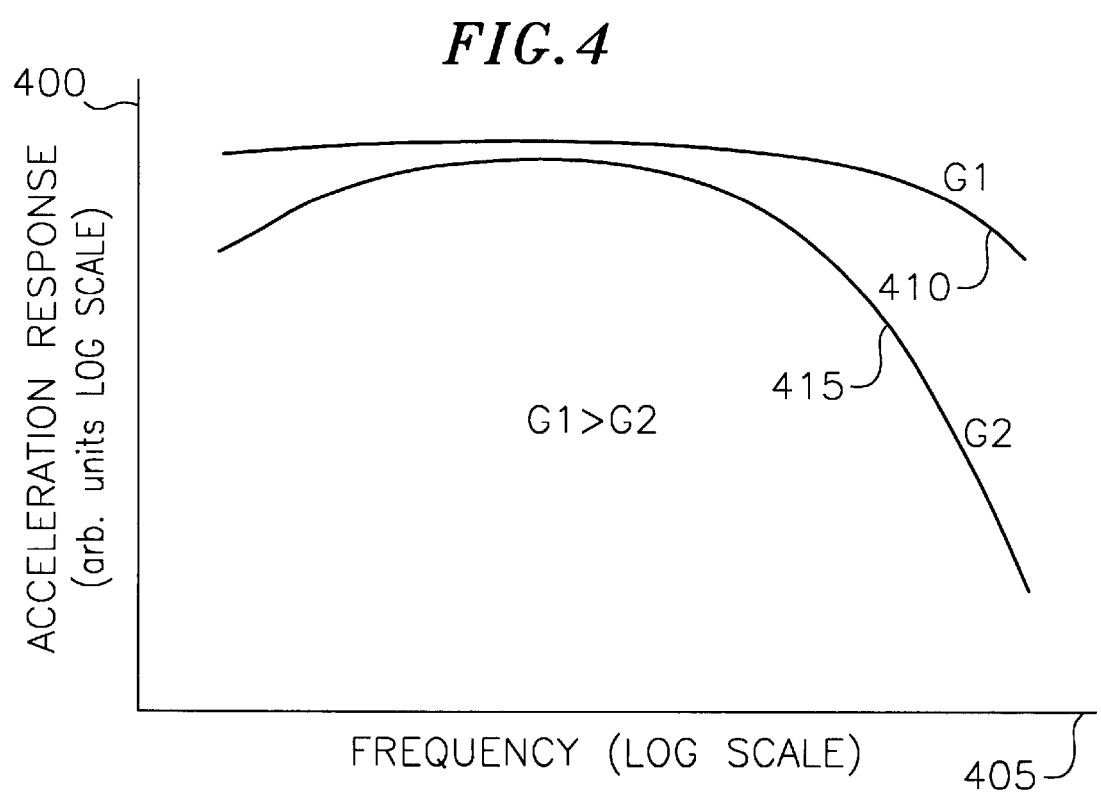
FIG. 4 illustrates the velocity response and acceleration response of the concept of the single coil force-balance feedback geophone of FIG. 2.

In this embodiment, the single-coil velocity geophone is converted to a transducer which converts external accelerations of the sensor housing into electrical signals which are proportional to the external acceleration over a frequency range extending from well below the natural resonant frequency, $f_o$, of the conventional geophone, to well above this frequency. Typically, the bandwidth extends from 0.1 $f_o$ to 10 $f_o$, although the actual bandwidth depends primarily on the so-called "loop gain" of the feedback loop. By adjusting this loop gain, the bandwidth of the resulting force-balance accelerometer can be varied. Normally, this gain adjustment can be made simply by modifying the proportional gain, G, of the feedback controller 330. This is shown in FIG. 4, where the response of the resulting force-balance accelerometer, to a constant acceleration, is plotted on the y-axis 400 as frequency is varied along the x-axis 405, for two different values of proportional gain, G1 and G2 (G1>G2). The curve for gain G1 410, has a flat (frequency independent response) over a wider frequency range than the curve for gain G2 415. Therefore, the bandwidth of the force-balance accelerometer is increased by increasing the overall loop gain.

A number of blocks shown in FIG. 3 share identical components. Specifically, within the geophone 200, the mass of the spring-mass-damper 300 is the same physical mass as the coil-mass 205, which is driven by the force actuator 315. Similarly, both the coil and the magnet of the coil-magnet velocity sensor 310 are the same physical coil and magnet used in the coil-magnet force actuator 315. These components are depicted separately in FIG. 3 in order to provide a clearer functional description of the embodiment.

Figure 5:
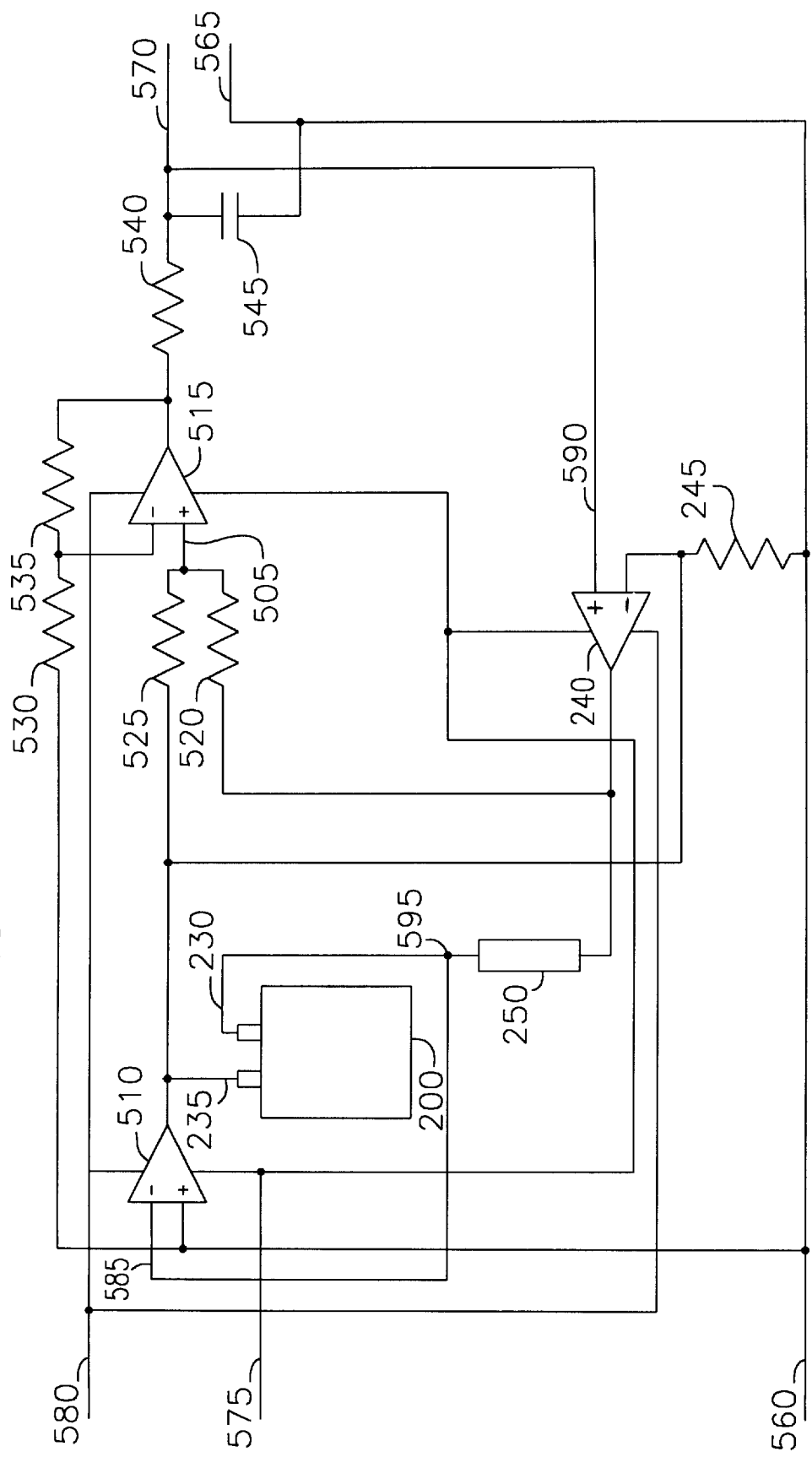
FIG. 5 is a circuit schematic of a single coil force-balance feedback geophone of the present invention.

One embodiment of the system of FIGS. 2 and 3 is an electronic circuit depicted in FIG. 5. The circuit includes a single-coil velocity geophone, including the standard magnet, springs, and coil. The coil is connected to first and second terminals of the geophone. In this embodiment, the first terminal 230 of the geophone 200 is connected to a "virtual" ground node 595 of an amplifier 510. The amplifier is provided external power by a positive power supply voltage input 575 and a negative power supply voltage input 580. The positive and negative power supply inputs 575, 580 provide power to all of the amplifiers used in the circuit. The second terminal 235 of the geophone is connected to the output of the same amplifier.

The "virtual" ground node is connected to the inverting input of the amplifier 510. The non-inverting input of the amplifier 510 is connected to a ground line 560. Small differences between the input voltages to the amplifier result in large differences in the output voltage. Accordingly, the inverting input to the amplifier 510, and thus node 595, is maintained at the voltage of the noninverting input, namely ground.

Also connected to the virtual ground node 595 is a reference impedance 250. Thus, the reference impedance and the coil are connected essentially in series as the inverting input of the inverting amplifier 510 draws very little current. The reference impedance is chosen so that the impedance of the reference impedance closely matches the impedance of the coil of the single-coil velocity geophone. Typically this match is made to closer than 1%.

The circuit also includes a transconductance amplifier 240. The output of the transconductance amplifier is connected to the reference impedance. Also included in the circuit are a pair of series connected resistors 520 and 525, with resistances $R_{520}$ and $R_{525}$ respectively. The resistor 525 is connected to the first terminal of the geophone and resistor 520. Resistor 520 is connected to resistor 525 and the output of the transconductance amplifier 240. The inverting input of the transconductance amplifier is connected to the first terminal of the geophone. Also connected to the inverting input of the transconductance amplifier is a resistor 245, with a resistance $R_{245}$. In one embodiment resistor 245 is an adjustable resistor.

Accordingly, the transconductance amplifier 240 is configured as a current source, with the current equal to the voltage at the noninverting input to the transconductance amplifier divided by the resistance $R_{245}$ of the resistor 245. The load is the pair of resistors 520 and 525 in parallel with the reference impedance and the geophone coil. The voltage across the reference impedance matches the contribution of the current flowing through the geophone's impedance to the total voltage appearing across the geophone terminals 230 and 235. Because of the use of the virtual ground at node 595, a pair of identical resistors 520 and 525 can be used to subtract this voltage component from the total voltage appearing across the geophone's terminals. The remaining voltage between the terminals, appearing at node 505, is nearly identical to the electromotive force being generated by the geophone's coil-magnet velocity sensor. This remaining voltage is proportional to the velocity of the conventional geophone's coil. Of course, the resistors 520 and 525 need not be identical, but as is the case with the coil and the reference impedance, need only to have an impedance, i.e., resistance, of a known ratio.

Node 505 is also connected to the non-inverting input of a proportional gain amplifier 515. A midpoint of a voltage divider formed by resistors 530 and 535, having resistances $R_{530}$ and $R_{535}$ respectively, is connected to the inverting input of the amplifier. Resistor 530 is also connected to the ground 560 and resistor 535 is also connected to the output of the amplifier 515. Accordingly, the amplifier 515 provides a proportional voltage gain that is equal to 1 plus the ratio of the resistances of resistor 535 and 530, i.e., $(1+R_{535}/R_{530})$.

The output of the amplifier 515 is passed through a low-pass filter. This is accomplished using a resistor 540 with a resistance $R_{540}$ and a capacitor 545. One end of the resistor 540 is connected to the output of the amplifier 515. The other end of the resistor 540 is connected to the device output 570. Also connected to the other end of the resistor 540 is the capacitor 545, which is also connected to ground 560. The resistor 540 and capacitor 545 therefore form a low pass filter. The resistance of resistor 540 and the capacitance of capacitor 545 are chosen such that the low pass filter reduces the amplitude of higher frequency signals which may result in high frequency oscillation of the system. The output of the device output 570 is fed back to the non-inverting input 590 of the transconductance amplifier 240. The polarities of the components in this circuit are set so that the system provides negative feedback.

Figure 1:
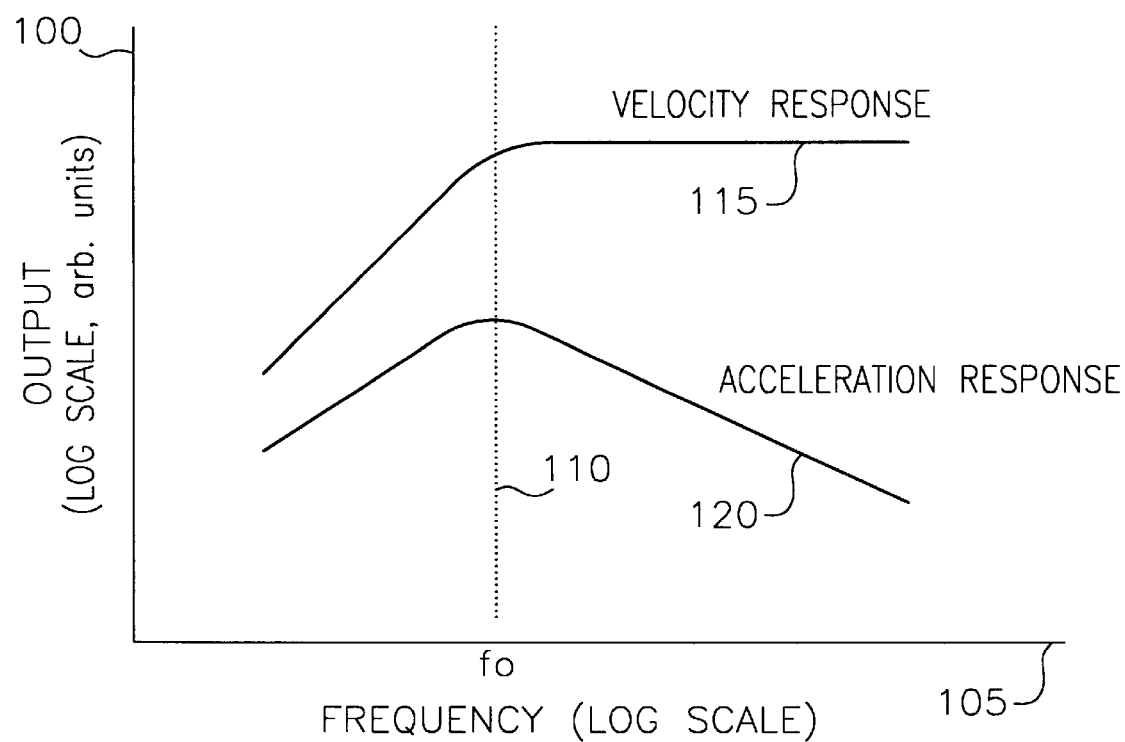
FIG. 1 illustrates the velocity response and acceleration response of a conventional geophone with respect to frequency.

Under negative feedback the circuit provides the necessary. current to the geophone coil such that the coil is held essentially fixed with respect to the housing of the geophone. Under this condition, the voltage at node 505 is held close to circuit ground potential. The circuit output 570 is a signal that is proportional to the current flowing through the geophone coil and therefore proportional to the feedback force being exerted on the coil. Because this force is proportional to the external acceleration applied to the geophone housing, whenever the coil is being held fixed with respect to the geophone housing by negative feedback the signal at output 570 is proportional to applied acceleration. The condition that the "coil is held fixed" is never completely true, as there is always a small amount of "error motion" generated by the feedback control system. Nevertheless, for the purposes of this invention, it is considered to be true whenever the feedback loop gain is much larger than 1. In this embodiment, the loop gain is typically in the range of 20 to 1000 for frequencies at least one decade above and at least one decade below the natural resonant frequency of the conventional geophone. In this case, the output voltage of the circuit, in response to an input acceleration, will be nearly constant (within 5%) over these two decades. This compares with the case of a conventional velocity geophone (without feedback, shown in FIG. 1), in which the response to acceleration is highly peaked at its natural resonant frequency, and in which the response has fallen by a factor of two within only one octave, on either side of this resonant frequency. Through the implementation of the circuit shown in FIG. 5, the bandwidth of the complete force-balance accelerometer is improved over that of the conventional, single-coil, velocity geophone from whit it is made.

Because the coil is being held essentially fixed with respect to the geophone housing, over the bandwidth of interest, the non-linearities inherent in the geophone are reduced. These non-linearities are related to the displacement of the coil and the deflection of the geophone's spring. By holding the coil fixed through force-balance feedback, the coil displacement and spring deflection are reduced. This reduces the sensor's non-linearities. The non-linearity added by the electronic circuit is negligible. The non-linearity of the complete force-balance accelerometer, therefore, is reduced over that of the conventional single-coil velocity geophone.

Furthermore, the operating range of the accelerometer can be adjusted by simply adjusting the resistance of the resistor 245. Reducing the resistance of resistor 245, the full-scale range of the force-balance accelerometer can be increased to a high level. Thus, the dynamic range of the force-balance accelerometer over that of the conventional, single-coil, velocity geophone from which it is made.

Figure 6:
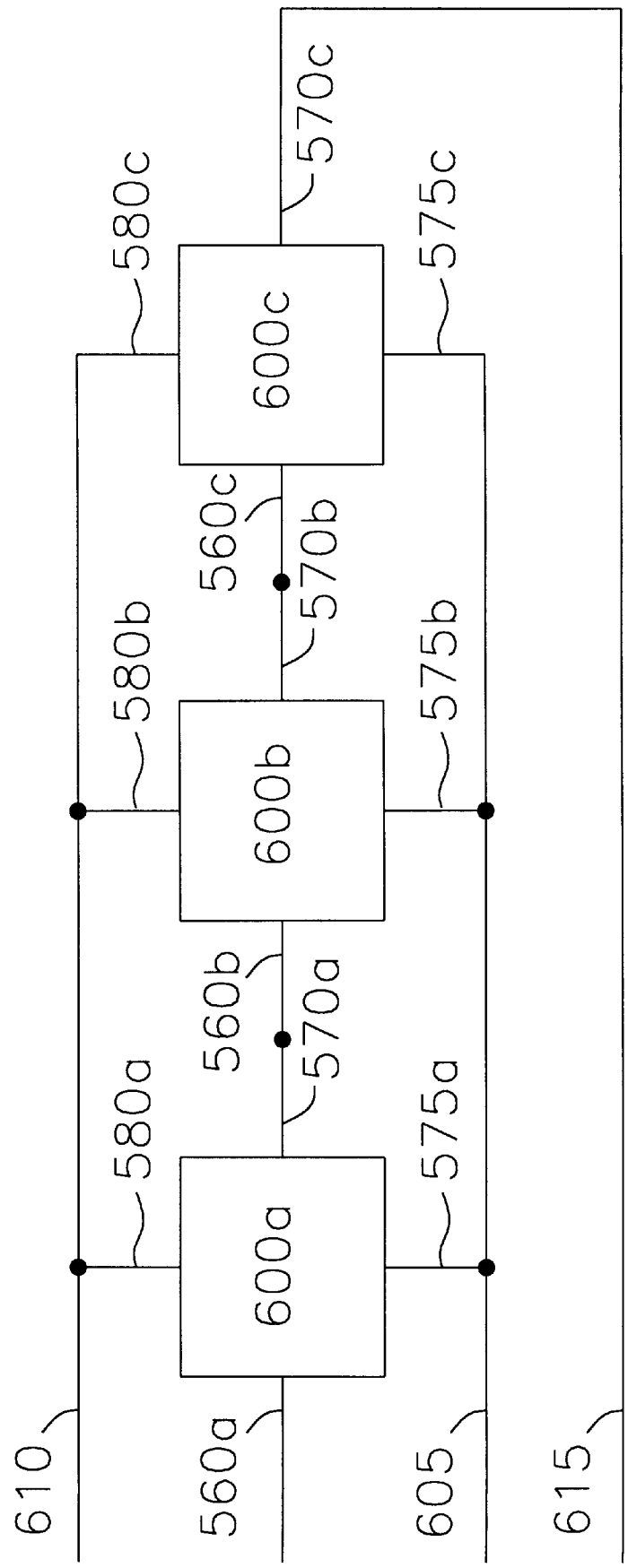
FIG. 6 is a block diagram of a number of single coil force-balance feedback geophones of FIG. 5 connected in series.

As previously stated, the circuit shown in FIG. 5 is provided power at nodes 575 (positive) and 580 (negative). It is provided a circuit ground at node 560. The output is referenced to this ground at node 565. Provided that the voltages at node 560 (ground) and node 570 (output) remain between the power supply voltages (voltages at nodes 575 and 580), then the ground potential can be floated to nearly any voltage within this range. This allows for the possibility of connecting a number of force-balance accelerometers in series such as implementation is illustrated in block diagram in FIG. 6. As shown in FIG. 6, the output 570 of one accelerometer drives the circuit ground node 560 of the next accelerometer. In this manner, a series combination of accelerometers can be formed. This is shown in FIG. 6, where a series connection of force-balance accelerometers 600a, 600b, and 600c is depicted. Power to the accelerometers is provided by a common set of wires 605 and 610. One wire 605 (providing the positive power supply) is connected to the accelerometers' positive power inputs 575a, 575b, and 575c of the accelerometers, while the second wire 610 is connected to the negative power inputs 580a, 580b, and 580c of the accelerometers. The output 570a of accelerometer 600a is connected to the floating ground 560b of accelerometer 600b. Similarly, the output 570b of accelerometer 600b is connected to the floating ground 560c of accelerometer 600c. The output signal 570c from the last accelerometer 600c is brought out to the beginning of the array at point 615. The total signal from the array is the signal at point 615. In this case, only three accelerometers are shown for simplicity. This technique can be extended to a larger number of accelerometers simply by repeating the connections shown in FIG. 6.

Although the invention has been described in certain specific embodiments, many additional modifications, substitutions, and variations will be apparent to those skilled in the art. It is therefore to be understood that this invention may be practiced otherwise than is specifically described. Therefore the present embodiments of the invention should be considered in all respects as illustrative and not restrictive, the scope of the invention to be indicated by the following claims rather than the foregoing description.

We claim:

1. A geophone comprising:
    a housing;
    a coil within the housing, the coil having first and second terminals connected to the coil;
    means for producing a magnetic field within the housing;
    spring means for converting mechanical acceleration of the housing to relative motion of the coil and the magnetic field, the relative motion of the coil and the magnetic field generating an induced potential across the terminals of the coil;
    means for generating a signal proportional to the induced potential; and
    a current source providing a controlled current to the coil based on the signal proportional to the induced potential.

2. The geophone of claim 1 wherein the controlled current provided to the coil generates a controlled potential across the terminals of the coil, the total potential across the terminals of the coil being equal to the induced potential and the controlled potential, and the means for generating a signal comprises means for subtracting the controlled potential from the total potential.

3. The geophone of claim 2 wherein the coil has a coil impedance associated therewith, and the means for subtracting the controlled potential from the total potential comprises a reference impedance connected in series with the coil, the reference impedance having an impedance proportional to the coil impedance, and means for providing a reference current to the reference impedance, the reference current being proportional to the controlled current.

4. The geophone of claim 3 wherein the reference impedance has an impedance matching the coil impedance, the means for providing the reference current comprises the current source, and the reference impedance is electrically coupled to the coil.

5. The geophone of claim 4 wherein the means for subtracting the controlled potential from the total potential further comprises a series impedance in parallel with the reference impedance and the coil, the current source providing controlled current to the series impedance and the reference impedance and the coil.

6. The geophone of claim 5 wherein the series impedance comprises first and second resistors connected in series, and the ratio of the resistance of the first and second resistors matches the ratio of the impedance of the coil and the reference impedance.

7. The geophone of claim 6 wherein a connection connects the first and second resistors in series, and the potential at the connection forms a preliminary signal representative of the induced potential across the first and second terminals of the coil.

8. The geophone of claim 7 wherein the preliminary signal is the signal proportional to the induced potential.

9. The geophone of claim 8 wherein a reference connection connects the reference impedance and the coil, and further comprising means for maintaining a reference potential at the reference connection.

10. The geophone of claim 9 further comprising an amplifier to increase the magnitude of the preliminary signal to form an intermediate signal, and a low pass filter to filter the intermediate signal to form a device signal.

11. The geophone of claim 10 wherein the device signal is the signal proportional to the induced potential.

12. A geophone comprising:
    a housing;
    a coil within the housing, the coil having first and second terminals connected to the coil;
    means for producing a magnetic field within the housing;
    spring means for converting mechanical acceleration of the housing to relative motion of the coil and the magnetic field, the relative motion of the coil and the magnetic field generating an induced potential across the terminals of the coil;
    a reference impedance connected in series with the coil;
    a series impedance connected in parallel with the reference impedance and the coil; and
    a current source providing a controlled current having a magnitude to a load, the load comprising the parallel connection of the series impedance, the reference impedance, and the coil.

13. The geophone of claim 12 wherein the series impedance comprises at least two elements, with an impedance connection point between the two elements, and the magnitude of the controlled current is based on a signal derived from the impedance connection point.

14. The geophone of claim 13 wherein the reference impedance is connected in series with the coil by a connector, and further comprising feedback means to maintain the connector at substantially a reference potential.

15. The geophone of claim 14 wherein the means for producing a magnetic field within the housing is a magnet attached to the housing, and the spring means comprises a spring connected to the housing and the coil.

16. An accelerometer system comprising:
at least two geophones, each geophone comprising:
a housing;
a coil within the housing, the coil having first and second terminals;
means for producing a magnetic field within the housing;
spring means for converting mechanical acceleration of the housing to relative motion of the coil and the magnetic field, the relative motion of the coil and the magnetic field generating an induced potential across the terminals of the coil;
a reference impedance connected in series with the coil by a connector;
a series impedance connected in parallel with the reference impedance and the coil, the series impedance comprising at least two elements with an impedance connection point between two of the at least two elements;
a current source providing a controlled current having a magnitude to a load, the load comprising the parallel connection of the series impedance, the reference impedance, and the coil, the current source controlling the magnitude of the controlled current based on a signal derived from the impedance connection point;
feedback means to maintain the connector at a potential substantially equal to a reference input; and
the reference input for a one of the at least two geophones is a ground potential and the reference input for a second of the at least two geophones is based on a signal derived from the impedance connection point.

17. A geophone comprising:
a housing;
a coil substantially within the housing, the coil having first and second terminals;
means for producing a magnetic field within the housing;
spring means for converting mechanical acceleration of the housing to relative motion of the coil and the magnetic field, the relative motion of the coil and the magnetic field generating an induced potential across the terminals of the coil; and a current source providing a current to the coil, the current having a magnitude, the magnitude of the current being based on a signal corresponding to the induced potential across the terminals of the coil and a property of a current source control element.

18. The geophone of claim 17 wherein the current source control element is a resistor and the property of the current source control element is the resistance of the resistor.

19. A geophone comprising:
a housing;
a coil substantially within the housing, the coil having first and second terminals;
means for producing a magnetic field within the housing;
spring means for converting mechanical acceleration of the housing to relative motion of the coil and the magnetic field, the relative motion of the coil and the magnetic field generating an induced potential across the terminals of the coil; and
a current source providing a current to the coil, the current having a magnitude, the magnitude of the current being proportional to a signal based on the induced potential across the terminals of the coil, with the proportionality determined by means for adjusting the magnitude of the current.

20. A geophone comprising:
a housing;
a coil substantially within the housing, the coil having first and second terminals;
means for producing a magnetic field within the housing;
spring means for converting mechanical acceleration of the housing to relative motion of the coil and the magnetic field, the relative motion of the coil and the magnetic field generating an induced potential across the terminals of the coil;
an adjustable proportional amplifier for amplifying a signal representative of the induced potential across the terminals of the coil and thereby providing an amplified signal; and
an adjustable current source providing a current to the coil, the current having a magnitude, the magnitude of the current being adjustably proportional to a signal based on the amplified signal.

21. The geophone of claim 20 further comprising a filter, the filter filtering the amplified signal to provide a filtered amplified signal, and the magnitude of the current being adjustably proportional to the filtered amplified signal.

* * * * *